United States Patent [19]

Steele

[11] Patent Number: 5,275,269
[45] Date of Patent: Jan. 4, 1994

[54] COMBINED DRIVE PULLEY AND ROTOR SHAFT SUPPORT FOR A REFRIGERANT COMPRESSOR

[75] Inventor: Duane F. Steele, Onsted, Mich.

[73] Assignee: Ford Motor Company, Dearborn, Mich.

[21] Appl. No.: 1,595

[22] Filed: Jan. 7, 1993

[51] Int. Cl.⁵ .................. F16D 27/10; F16D 27/14
[52] U.S. Cl. ........................... 192/84 C; 192/110 B
[58] Field of Search .................. 192/84; 417/319; 418/69

[56] References Cited

U.S. PATENT DOCUMENTS

| | | |
|---|---|---|
| 3,055,475 | 9/1962 | Pitts .................. 192/84 C |
| 3,149,706 | 9/1964 | Mason et al. ............ 192/84 C X |
| 3,269,200 | 8/1966 | Vaughn et al. . |
| 3,415,347 | 12/1968 | Wrensch ................... 192/84 |
| 3,675,747 | 7/1972 | Obermark .................. 192/48.2 |
| 3,743,068 | 7/1973 | Westervelt et al. ........... 192/84 |
| 4,488,627 | 12/1984 | Streich et al. .............. 192/48.2 |
| 4,566,574 | 1/1986 | Marshall .................. 192/84 |
| 4,718,526 | 1/1988 | Koitabashi ................ 192/35 |
| 4,909,369 | 3/1990 | Bausch ................... 192/84 |

FOREIGN PATENT DOCUMENTS

| | | |
|---|---|---|
| 702470 | 1/1965 | Canada . |
| 0065923 | 12/1982 | European Pat. Off. . |
| 1319912 | 12/1963 | France . |
| 1322039 | 12/1963 | France . |
| 55-119228 | 9/1980 | Japan . |
| 57-22423 | 2/1982 | Japan . |
| 57-43029 | 3/1982 | Japan . |
| 57-204331 | 12/1982 | Japan . |
| 59-47538 | 3/1984 | Japan . |
| 59-115494 | 7/1984 | Japan . |
| 59-226721 | 12/1984 | Japan . |

*Primary Examiner*—Rodney H. Bonck
*Attorney, Agent, or Firm*—Roger L. May; Raymond L. Coppiellie

[57] ABSTRACT

A bearing arrangement for an air conditioning compressor comprising a compound bearing assembly that is adapted to journal a drive pulley and electromagnetic clutch assembly wherein the bearing assembly is adapted to distribute loads on the rotor shaft for the compressor whereby the shaft loading on the rotor shaft and the radial forces acting on the drive pulley are transferred through common bearing structure to the fixed compressor housing, thereby simplifying the bearing construction and eliminating machining operation during manufacture.

3 Claims, 2 Drawing Sheets

COMBINED DRIVE PULLEY AND ROTOR SHAFT SUPPORT FOR A REFRIGERANT COMPRESSOR

TECHNICAL FIELD

This invention relates to automotive air conditioning compressors and to an improved bearing arrangement for journalling the compressor rotor and the rotary elements of a drive pulley and electromagnetic clutch assembly.

BACKGROUND OF THE INVENTION

Automotive type air conditioning systems comprise a compressor mounted in the automotive engine compartment. The compressor includes a housing that contains pumping elements for pressurizing a refrigerant gas in the automotive air conditioning system. The pumping elements may consist of double-acting, axially disposed piston and cylinder mechanisms driven by a swash plate carried by a torque input driveshaft.

Other compressors, such as the compressor disclosed in my copending patent application Ser. No. 001,600, filed Jan. 7, 1993, entitled "Scroll-Type Compressor Having Unidirectional Rotor", may comprise a pair of scrolls, one of which is fixed and the other of which follows an orbital path relative to the fixed scroll. The scrolls have wraps that define pressure chambers between tangential contact points between the wraps of the individual scrolls.

Regardless of which type of pumping elements is used, it is necessary to drive the pumping elements by a torque input driveshaft, sometimes referred to as the rotor shaft. The driveshaft, in turn, is adapted to be coupled to a drive pulley by means of a selectively engageable electromagnetic clutch.

It is common practice to journal the armature for the electromagnetic clutch and the drive pulley on a fixed sleeve that forms a part of the compressor housing. This arrangement is shown for example in prior art U.S. Pat. No. 4,718,526. The clutch and pulley arrangement of that patent may be used for driving the scrolls of a scroll-type compressor as disclosed, for example, in U.S. Pat. Nos. 4,730,988 and 4,696,630.

My copending patent application identified above is assigned to the assignee of my present invention.

In a typical prior art bearing arrangement for a clutch and the drive pulley for a compressor, the shaft bearings are located within a fixed sleeve. This requires careful machining of a shaft bearing opening so that it is precisely concentric to the axis of the rotor shaft. Further, the same fixed sleeve is adapted to support the inner race of a bearing for the pulley and the armature of the electromagnetic clutch. This requires a separate precision machining operation.

It is necessary in such prior art designs for special steps to be taken during the machining operation to precisely locate the bearing center for the pulley and clutch assembly with respect to the bearing center for the rotor shaft assembly.

This makes it necessary to effect costly tolerance controls during the manufacturing operation. It also makes it necessary to provide separate bearings for the shaft and for the pulley and clutch assembly.

BRIEF DESCRIPTION OF THE INVENTION

The improved bearing arrangement of my invention makes it unnecessary to locate the compressor rotor shaft bearing inside the stationary mounting sleeve of the compressor housing. It requires only a single finish machining operation for a bearing assembly that is common to the rotor shaft and the clutch and pulley assembly. It is necessary to maintain only a single bearing center, thereby making it unnecessary to maintain close tolerances between separate bearing centers as in prior art constructions.

A single bearing assembly can be used for the pulley assembly and rotor shaft. By mounting the bearing assembly on the crankshaft directly or through a drive hub, a shaft support is provided. The bearing assembly is journalled on a housing support sleeve, thereby forming a common journal for the shaft and the pulley and clutch assembly and eliminating close tolerance machining. This also saves material and labor cost during assembly. It also reduces the weight because of the reduced size of the pulley and clutch components that may be used with such a unitary bearing mount.

Tandem bearings situated in side-by-side relationship are located within the pulley hub on a single diameter. An engagement plate for the electromagnetic clutch has a hub that is splined directly to the outboard end of the driveshaft. The hub is journalled on a bearing assembly having a first bearing portion within the pulley. The bearing loads on the shaft, as well as the loads on the engagement plate, are transferred from the first bearing portion to a second bearing portion, the latter being supported on a machined bearing mounting surface on the fixed sleeve of the compressor housing. Thus, the clutch and pulley bearing acts also as a front main bearing for the rotor shaft.

PARTICULAR DESCRIPTION OF THE INVENTION

For the purpose of describing a structural environment for the improved bearing arrangement of my invention, I first will refer here to a prior art bearing assembly for use in a scroll-type automotive air conditioning compressor of the kind as shown in the '998 and '630 patents described above.

Figure 1:
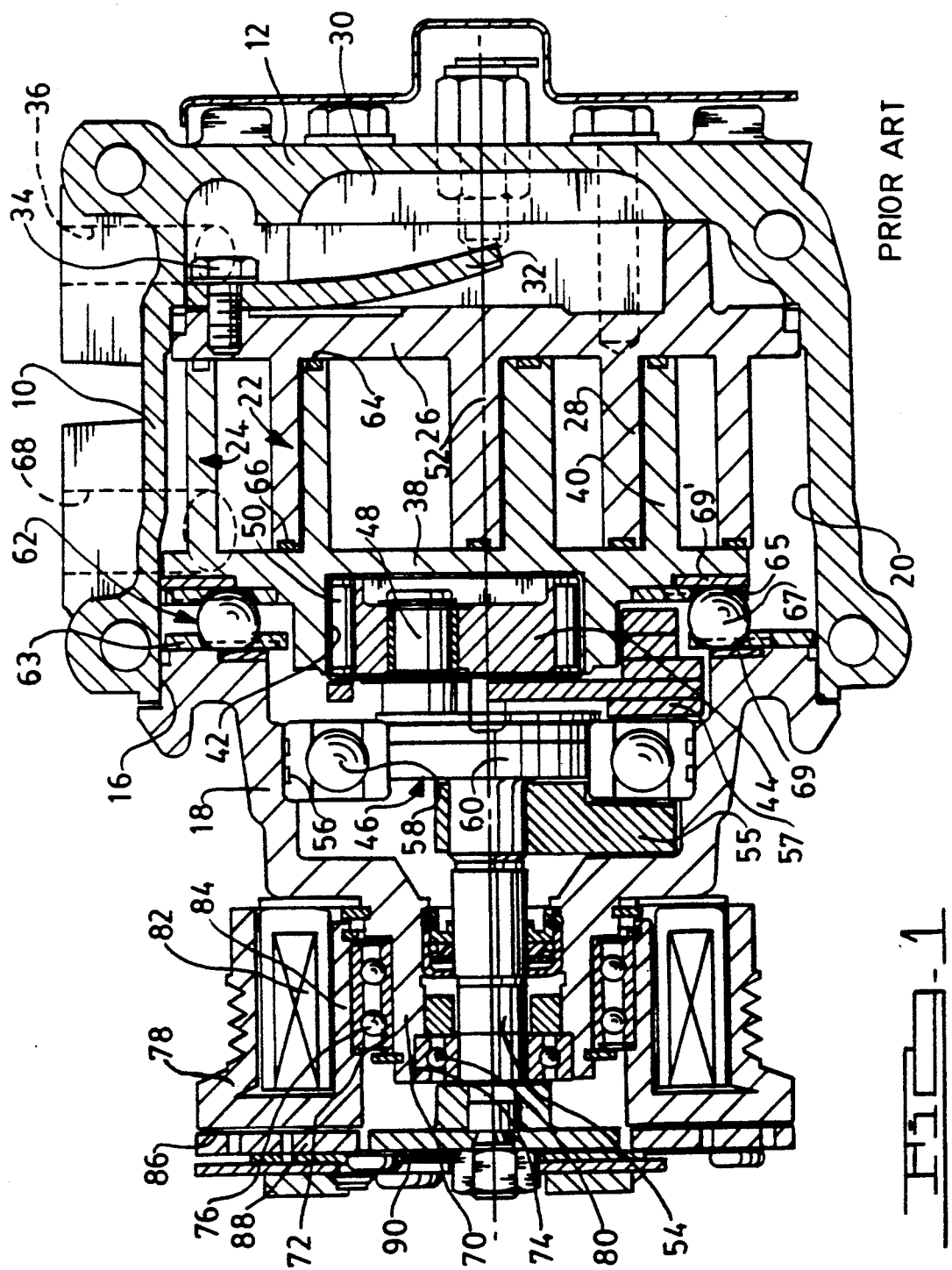
FIG. 1 shows a prior art scroll-type compressor having separate bearing assemblies for the electromagnetic clutch and pulley and for the compressor driveshaft.

The prior art compressor of FIG. 1 comprises a cast aluminum housing 10 having a generally cylindrical shape and a closed end portion 12. The housing 10 is open, as shown at 16. A bearing support end plate 18 is received within the opening 16 and is held in place by suitable fastening means, not illustrated.

A pair of scrolls is disposed in the interior compressor cavity 20. This includes a fixed scroll 22 and a relatively movable scroll 24. Fixed scroll 22 includes a scroll disc portion 26 and a refrigerant pumping portion 28 that comprises multiple wraps with surfaces that conform to the shape of an involute of a circle. A discharge port (not shown in FIG. 1) is located generally on the axis of the fixed scroll 22. That port communicates with a high pressure refrigerant pressure chamber 30 located between disc portion 26 and the end portion 12 of the housing 10.

A movable valve element 32, secured to the scroll disc portion 26, is adapted normally to close the high pressure port. It is a flexible valve element that is anchored by a retainer bolt 34 secured to the scroll disc portion 26. Valve element 32 functions as a one-way flow valve that becomes unseated when the pressure in the pumping chambers of the scrolls reaches the discharge pressure in chamber 30. A pressure distributor port, shown with phantom lines at 36, communicates with the pressure chamber 30.

The movable scroll 24 comprises end disc portion 38 and pumping portion 40. The pumping portion 40 comprises multiple involute wraps that are nested with the wraps of the fixed scroll 22. As in the case of the fixed scroll 22, the wraps of the movable scroll 40 are shaped in the form of an involute of a circle. The involute surfaces of the fixed scroll contact involute surfaces of the movable scroll at tangent points. A pair of pumping chambers is defined by the registering wraps of the scrolls, the extent of the pumping chambers being defined by the locations of the tangent points.

A bearing pocket 42 in the scroll end disc portion 38 receives a compliant coupling disc portion 44 of an anti-rotation ball coupling identified generally by reference character 46.

The ball coupling 46 includes a crank pin 48 journalled within the disc portion 44, the latter having a cylindrical outer surface that is journalled within the pocket 42 by means of roller bearings 50. The crank pin 48 is situated in offset relationship with respect to the axis of the fixed scroll, the axis being identified in FIG. 1 by reference numeral 52.

The coupling disc portion is provided with means, not shown, for effecting limited lost angular adjustment of the movable scroll relative to portion 44. This will facilitate passage of an occasional liquid slug of refrigerant through the compressor.

The crank portion 48 is connected drivably to compressor driveshaft 54, which is journalled in bearing opening 56 formed in plate 18. A journal for the shaft 54 includes ball bearing 58 having an inner race that registers with cylindrical bearing portion 60 carried by the driveshaft 54. A counterweight 55 is carried by crankshaft 54 at a location 180° displaced from crank portion 48. Another counterweight 57 is located in the opposite side of bearing 58.

For an understanding of the mode of operation of the scroll compressor illustrated in FIG. 1, reference may be made to my copending application identified above, which is assigned to the assignee of my present invention.

An anti-rotation roller thrust bearing assembly 62 is disposed between the scroll disc portion 38 and the end plate 18. This axially positions the movable scroll and accommodates any axial thrust acting on the movable scroll. It also prevents relative angular movement of the scrolls as the movable scroll follows an orbital path. The ends of the wraps for the movable scroll are sealed with respect to the disc portion 26 of the fixed scroll by a running seal 64. Similarly, a seal 66 is located between the ends of the wraps of the fixed scroll and the adjacent surface of the disc portion 38 of the movable scroll.

Bearing 62 includes plate 63 fixed to the housing and plate 65 connected to the movable scroll. Balls 67, which are received in openings in plates 63 and 65, react against thrust rings 69 and 69' as they orbit in the openings. The motion of the movable scroll is not unlike the motion that would be generated by a well known Oldham coupling.

A suction pressure passage leading to the compression chambers defined by the scrolls is shown by means of dotted lines in FIG. 1 at 68.

In the conventional compressor design of FIG. 1, the end plate 18 carries a fixed sleeve or nose 70 having a machined outer cylindrical surface 72 and a machined inner cylindrical surface 74. Surface 72 is a mounting surface for the inner race of pulley bearing assembly 76 for a compressor driveshaft drive pulley 78. The nose 70 defines a sleeve that acts as a bearing support for the bearing 80 for driveshaft 54 and as a bearing support for the bearing 76.

Pulley 78 encloses electromagnetic coil windings 82 which surround the hub 84 of the pulley.

The pulley 78 includes a radial portion having a friction clutch surface 86 situated directly adjacent a friction clutch engagement plate 88. Driveshaft 54 is connected drivably to the engagement plate 88 through a drive spring arrangement 90.

It is necessary in the pulley and clutch assembly of FIG. 1 for precise machining operations to be made to locate properly the bearing seat for the shaft bearing 80 and for the pulley bearing 76. This precision machining operation must occur so that the bearing surfaces are formed to precise diametric limits and to precise concentricity, one with respect to the other.

Figure 2:
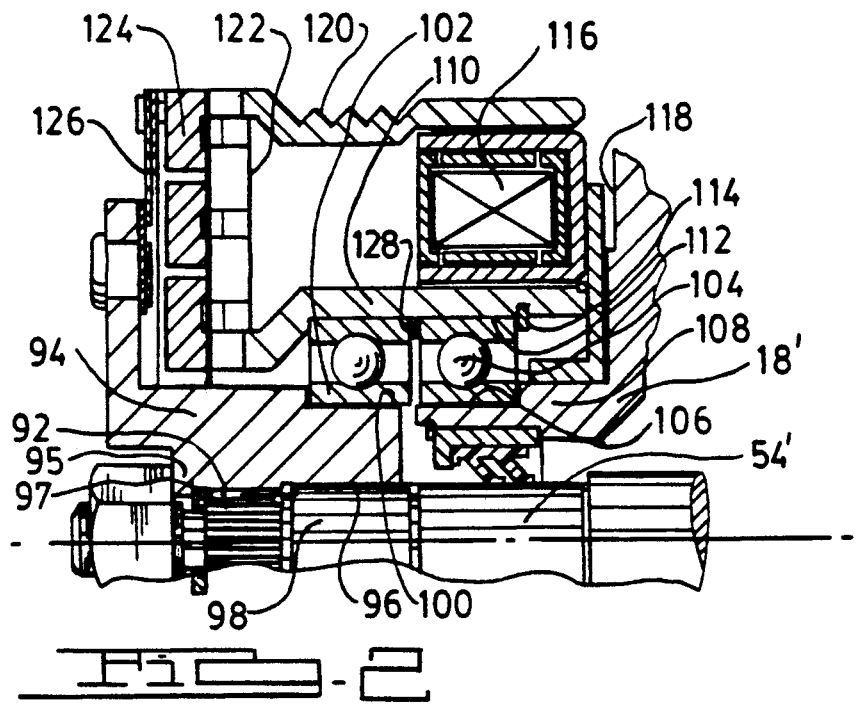
FIG. 2 is a cross-sectional view taken along a plane that contains the axis of the compressor driveshaft for a compressor of the type shown in FIG. 1.

In FIG. 2, the driveshaft is indicated by reference numeral 54', which corresponds to the driveshaft 54 of FIG. 1. Driveshaft 54' is splined at 92 to internal spline teeth formed in clutch hub 94. Hub 94 is also provided with a pilot surface 96 which is received on pilot portion 98 of the shaft 54'.

Hub 94 has a shoulder 95. A spacer washer 97 is located between shoulder 95 and an adjacent shoulder on shaft 96 to permit control of the air gap between the engagement plate and the pulley, which will be described subsequently.

Hub 94 is provided with a machined bearing surface 100 on which is positioned the inner race of a first ball bearing 102. A companion ball bearing 104 is situated adjacent bearing 102 and is supported on a machined bearing surface 106 on the outer diameter of stationary sleeve portion 108 which forms a part of compressor plate 18'. This plate corresponds to compressor plate 18 of the FIG. 1 construction.

A pulley hub 110 is provided with a single diameter internal bearing surface 112. The hub receives the bearings 102 and 104, which are held in place against an internal bearing shoulder formed by snap ring 114.

Electromagnetic clutch coil windings 116 are carried by plate 18' and are fixed to shoulder 118 on the plate 18'. A drive belt drivably engages pulley drum portion 120. Friction clutch plate 122 is secured to the pulley assembly and is disposed directly adjacent clutch engagement plate 124, the latter being secured to clutch hub 94 through flexible radial spring elements 126. The tandem arrangement of the bearings 102 and 104 provide a load path from the driveshaft 54' to the stationary housing plate 18'. The bearing assembly comprising the bearing elements 102 and 104 also provides a bearing support for the pulley. Thus, the bearing assembly has a dual function, thereby eliminating the necessity for providing a unique independent bearing for the driveshaft 54'. This greatly simplifies the cost of the assembly and simplifies further the assembly operations.

Further, in addition to the avoidance of a double bearing arrangement of the kind shown in the FIG. 1 construction, the bearings 102 and 104 may be interchangeable, thereby further simplifying the manufacture and assembly.

The outer races for the bearings 102 and 104 are separated by a spacer 128 shown in FIG. 2. If desired, the outer races for the bearings 102 and 104 may be replaced by a common outer race, and the inner races are split to permit relative rotation of the clutch hub and the driveshaft with respect to the compressor housing plate 18'.

Only a single bearing assembly thus is required to journal the compressor clutch and the driveshaft for the compressor rotor without the necessity for close tolerance machining of the bearing supporting surfaces.

Figure 3:
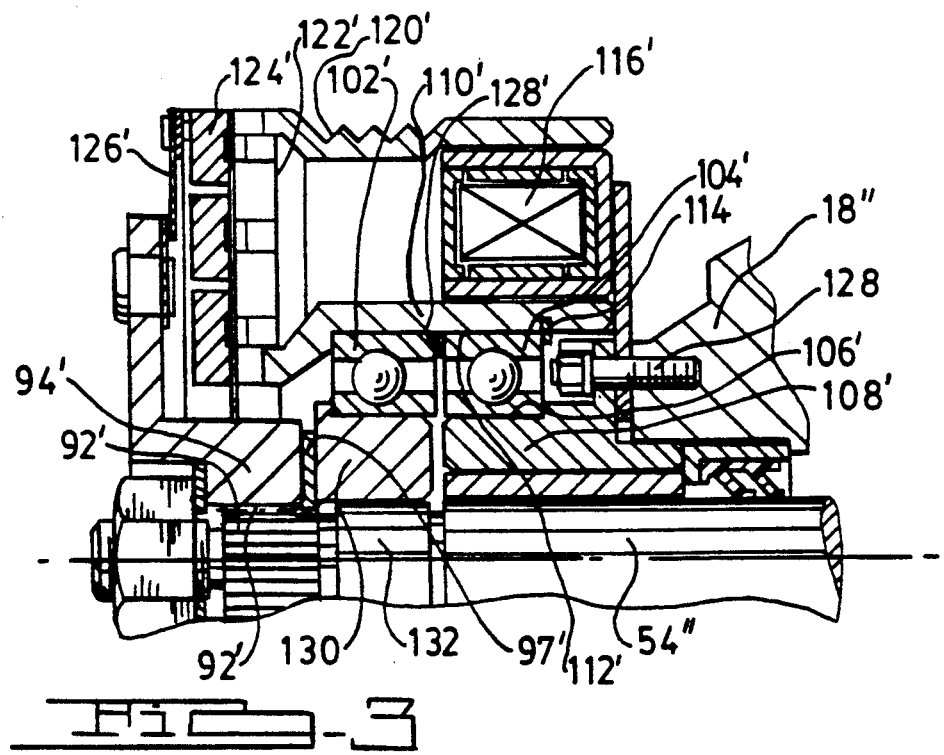
FIG. 3 shows an alternate embodiment of the bearing arrangement shown in FIG. 2.

In the embodiment of FIG. 3, a spacer 97' is located between hub 94' and mounting ring 130 to permit control of the air gap between the engagement plate 124' and the plate 122'.

The FIG. 3 embodiment shows a variation of the structure shown in FIG. 2. It includes the elements described with reference to FIG. 2, but the reference characters applied to the elements of FIG. 3 that have counterpart elements in the construction of FIG. 2 carry prime notations.

In the FIG. 3 construction, the housing nose that supports the compressor pulley is comprised of a sleeve that is secured by bolts 128 to the housing end plate 18". In addition, the hub 94', which is splined at 92' to the driveshaft 54", does not support the bearing 102'. Instead, a mounting ring 130 is positioned over shoulder 132 formed on shaft 54" and is assembled with a slip fit over the shoulder 132. This ring 130, in turn, supports the inner race of the bearing 102, the outer diameter of the ring 130 being the same as the inside diameter of the bearing 104'.

Having described preferred embodiments of my invention, what I claim and desire to secure by United States Letters Patent is:

1. A clutch and bearing assembly for a fluid compressor comprising a compressor housing, a compressor rotor in said housing, said rotor defining a fluid compression chamber;

a bearing mounting sleeve defined by a stationary nose portion of said housing, a rotor driveshaft extending through said mounting sleeve;

a drive pulley surrounding said mounting sleeve;

electromagnetic clutch coil windings secured to said housing within said pulley, said pulley being joined to a clutch friction engagement member and having a radial clutch friction surface;

a hub portion of said pulley defining an electromagnetic clutch core;

an electromagnetic clutch engagement plate adjacent said friction surface;

a clutch hub drivably connected to said driveshaft;

spring means for connecting said engagement plate to said clutch hub whereby said engagement plate frictionally engages said friction surface; and compound bearing means within said pulley hub portion for supporting said drive pulley and said driveshaft;

said bearing means having separate first and second bearing portions within said pulley hub portion and including separate relatively movable inner race portions respectively supporting said clutch hub and said pulley hub portion whereby driveshaft loads and pulley loads are distributed through said compound bearing means to said sleeve.

2. The combination as set forth in claim 1 wherein said bearing portions have outer races of a common diameter fitted within said pulley hub portion.

3. The combination as set forth in claim 2 wherein said bearing portions have inner races of substantially the same diameter, said bearing portions being disposed about the outside diameter of said sleeve whereby loads on said driveshaft are transferred through said first of said bearing portions to said second of said bearing portions, radial loads on said pulley being transferred to said mounting sleeve through said second of said bearing portion.

* * * * *